(12) United States Patent
Tai et al.

(10) Patent No.: US 6,470,904 B1
(45) Date of Patent: Oct. 29, 2002

(54) NORMALLY CLOSED IN-CHANNEL MICRO CHECK VALVE

(75) Inventors: Yu-Chong Tai, Pasadena; Xuan-Qi Wang, Los Angeles, both of CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/670,010

(22) Filed: Sep. 25, 2000

Related U.S. Application Data

(60) Provisional application No. 60/156,077, filed on Sep. 24, 1999.

(51) Int. Cl.[7] .......................... F16K 15/14; H01L 21/20
(52) U.S. Cl. .................... 137/15.18; 137/854; 137/907; 137/843
(58) Field of Search ................................ 137/12, 15.18, 137/375, 511, 529, 843, 846, 852, 854, 907; 251/129.01; 417/322, 413.1, 413.2, 413.3

(56) References Cited

U.S. PATENT DOCUMENTS

| | | | | |
|---|---|---|---|---|
| 4,143,853 A | * | 3/1979 | Abramson | 137/846 |
| 4,585,209 A | * | 4/1986 | Aine et al. | 137/855 |
| 5,244,537 A | * | 9/1993 | Ohnstein | 156/643 |
| 5,259,737 A | * | 11/1993 | Kamisuki et al. | 417/322 |
| 5,261,459 A | * | 11/1993 | Atkinson et al. | 137/846 |
| 5,284,179 A | | 2/1994 | Shikida et al. | |
| 5,309,943 A | | 5/1994 | Stevenson et al. | |
| 5,441,597 A | * | 8/1995 | Bonne et al. | 216/2 |
| 5,453,097 A | * | 9/1995 | Paradis | 137/849 |
| 5,660,205 A | * | 8/1997 | Epstein | 137/853 |
| 5,725,017 A | * | 3/1998 | Elsberry et al. | 137/529 |
| 5,967,163 A | | 10/1999 | Pan et al. | |
| 6,116,863 A | | 9/2000 | Ahn et al. | |

OTHER PUBLICATIONS

Phillips Semiconductor, "The I²C-bus and how to use it (including specifications)", pp. 1-24, 4/95.

* cited by examiner

*Primary Examiner*—John Rivell
*Assistant Examiner*—Ramesh Krishnamurthy
(74) *Attorney, Agent, or Firm*—Fish & Richardson P.C.

(57) ABSTRACT

In an embodiment, a check valve assembly may include an in-channel check valve connected between the front and rear portions of a channel attached to a silicon substrate. The channel may have a width between about 10 μm and about 400 μm, and the check valve may have a width between about 50 μm and about 500 μm. The check valve may be generally circular in shape. The check valve may also be normally closed, that is, sealed in the absence of a pressure differential between the front and rear portions of the channel. The check valve may include a sealing cap that contacts a valve seat to seal the valve. The sealing cap and the valve seat may each be formed from Parylene C membranes that are about 1 μm to about 5 μm thick. The valve seat may include a metal layer to separate the contacting surfaces of the valve seat and the sealing cap in the closed position. The check valve may open for forward pressures that match or exceed a threshold pressure and remain closed for forward pressures below the threshold pressure and reverse pressures.

20 Claims, 5 Drawing Sheets

NORMALLY CLOSED IN-CHANNEL MICRO CHECK VALVE

This application claims priority to U.S. Provisional Application Ser. No. 60/156,077, filed on Sep. 24, 1999 and entitled "Normally Closed In-Channel Micro Check Valve."

GOVERNMENT LICENSE RIGHTS

The U.S. Government has a paid-up license in this invention and the right in limited circumstances to require the patent owner to license others on reasonable terms as provided for by the terms of Grant No. SR01 RR06217-06.

TECHNICAL FIELD

This invention relates to check valves in micro-fluidic systems, and more particularly to an in-channel check valve.

BACKGROUND

Micropumps are devices that can pump and valve small volumes of fluids. A number of micropumps have been demonstrated, many of them diaphragm pumps utilizing check valves and piezoelectric actuation. Some of these micropumps have demonstrated low power consumption and reasonable flow rates, but out-of-plane fluid flow may be occur due to the absence of a good in-channel check valve for such micropumps.

Check valves are passive devices that may be opened for a forward fluid flow and closed for a reverse fluid flow. In micro-fluidic systems, check valves may be used individually in a channel to isolate fluid flow in a particular direction, or they may be used in pairs to direct fluid flows in micropumps.

It may be advantageous to provide an in-channel normally closed check valve that may be fabricated on a substrate with other micro-fluidic system components, e.g., micropumps and channels, to form an integrated micro-fluidic system.

SUMMARY

A check valve assembly according to an embodiment may include an in-channel check valve connected between the front and rear portions of a channel. The check valve and the channel may both be attached to a common silicon substrate. The channel may have a width between about 10 $\mu$m and about 400 $\mu$m, and the check valve may have a width between about 50 $\mu$m and about 500 $\mu$m. The check valve may be generally circular in shape. The check valve may also be normally closed, that is, sealed in the absence of a pressure differential between the front and rear portions of the channel.

The check valve may include a sealing cap that contacts a valve seat to seal the valve. The sealing cap and the valve seat may each be formed from polymer membranes that are about 1 $\mu$m to about 5 $\mu$m thick. According to various embodiments, the polymer may be selected from Parylene, Mylar, polyurethane, and flourosilicone. The valve seat may include a metal layer of gold, or a chrome/gold multi-layer, to separate the contacting surfaces of the valve seat and the sealing cap in the closed position. The metal layer may be several hundred angstroms thick.

According to an embodiment, the check valve may open for forward fluid flows, that is, pressures that bias fluid flow from the front portion to the rear portion of the channel. The check valve may accommodate fluid flow rates in a range of about 1 nl/min to about 1 $\mu$l/min.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
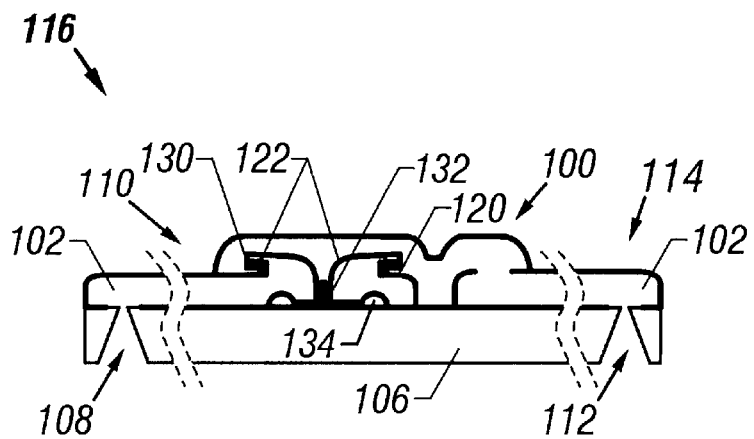
FIGS. 1A–1B illustrate a check valve assembly including an in-channel check valve in a normally closed state according to alternate embodiments.
Figure 1B:
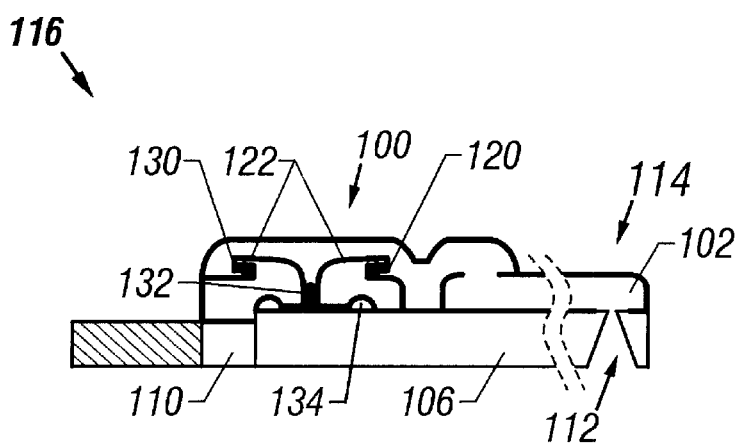

FIGS. 1A and 1B illustrate an in-channel micro check valve 100 according to alternate embodiments. The check valve 100 may regulate fluid flow in a channel 102. The channel 102 and check valve 100 may be formed from polymer membranes on a substrate 106. The substrate may be selected from a number of materials, including, for example, silicon, glass, plastics, and aluminum.

The substrate 106 may include an inlet 108 for introducing a fluid into a front portion 110 of the channel and an outlet 112 for ejecting the fluid from a rear portion 114 of the channel 102. A check valve assembly 116 may include the check valve 100, the channel 102, and the substrate 106. The front and rear portions of the channel 102 may be parallel to the surface of the substrate 106, as shown in FIG. 1A. According to alternate embodiments, the front portion 110 and/or rear portion 114 of the channel may extend through the substrate into the check valve 100, as shown in FIG. 1B.

According to an embodiment, the check valve 100 may be normally closed, that is, sealed in the absence of a pressure differential between the front and rear portions of the channel 102. The check valve 100 may permit fluid flow from the front portion 110 to the rear portion 114 of the channel, i.e., forward flow, in response to a forward pressure that matches or exceeds a threshold forward pressure. The check valve 100 may also prevent backflow from the rear portion 114 toward the front portion 100 of the channel in response to reverse pressures up to a breakdown backpressure. At the breakdown backpressure, the check valve 100 may catastrophically fail, for example, by delaminating from the substrate 106. The breakdown backpressure may be significantly higher than the threshold pressure. For example, the breakdown backpressure may be about 40 psi and the threshold pressure may be about 0.3 to 3.5 psi.

The check valve 100 may have a generally circular shape and include a valve seat 120 and a sealing cap 122. For forward pressures below the threshold pressure and back pressures below the breakdown backpressure, the circumferential edge of the sealing cap 122 may contact and overlap the valve seat 120, thereby sealing the check valve 100 and preventing fluid flow between the front and rear portions of the channel 102. This state is shown in FIG. 1. For forward pressures above and including the threshold pressure, the sealing cap 122 may be pushed off of the valve seat 120 by the fluid, opening the valve and permitting fluid to flow from the front portion 110 to the rear portion 114 of the channel 102.

The circumferential contacting (sealing) surfaces of the valve seat 120 and the sealing cap 122 may be separated by a layer of metal 130, for example, a gold film or a multi-layer gold/chrome film. The metal film 130 may reduce a stiction force between the two polymer surfaces. The sealing cap 122 may be supported by a stem 132 connected to a collapsed chamber 134 at the bottom of the check valve 100.

The dimensions of the valve seat 120 and the sealing cap 122 may depend on the width of the channel 102. According to various embodiments, the channel 102 may have a width of from about 10 $\mu$m to about 400 $\mu$m. In general, the diameters of the valve seat 120 and the sealing cap 122 may be about 50 $\mu$m to about 100 $\mu$m larger than the channel width.

The check valve 100 may be suitable for regulating fluids at low flow rates, for example, between about 5 nl/min and 1 $\mu$l/min. The check valve 100 may regulate fluids in different phases, including gases, liquids, and gas/liquid mixtures.

According to an embodiment, the check valve 100 may be formed on the substrate 106 using fabrication techniques similar to those used for fabricating electronic devices in silicon. For example, a number of check valve assemblies 116 may be formed simultaneously on a silicon wafer that may then be diced to separate the individual assemblies 116. FIGS. 2A–2G illustrate stages in an exemplary fabrication process.

A 1.5 $\mu$m thick silicon dioxide layer may be thermally grown on a front surface and a back surface of a silicon wafer at 1050° C. The silicon dioxide layer on the back surface of the wafer may be patterned and etched using a buffered hydrofluoric acid (BHF) to expose silicon surface areas corresponding to the inlet 108 and the outlet 112. A photoresist layer may be provided on the front surface of the wafer to protect the silicon dioxide layer on that surface from the etchant.

The wafer may be immersed in potassium hydroxide (KOH) to etch the inlet 108 and outlet 112 until about a 10 $\mu$m thick silicon membrane 200 remains between the top of the inlet/outlet and the front surface of the wafer. The silicon dioxide layer on the front surface of the wafer may be removed with a BHF etch, followed by a three minute BrF$_3$ gas phase etch to roughen the front surface. The wafer may then be immersed into an adhesion promoter, e.g., a 0.5% solution of an A-174-type adhesion promoter supplied by Specialty Coating Services, Inc. of Indianapolis, Ind., for twenty minutes followed by a fifteen to thirty second alcohol rinse.

Figure 2A:
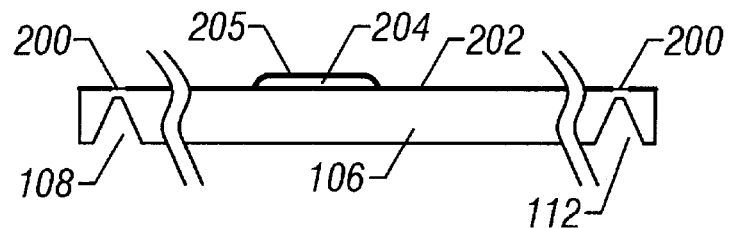
FIGS. 2A–2G illustrate a number of stages in a process for fabricating the check valve assembly of FIG. 1.

A 1 $\mu$m polymer layer 202 may be formed on the front surface of the wafer, as shown in FIG. 2A. The polymer may be a polymer supplied by Specialty Coating Services, Inc., and sold under the trade name Parylene. An advantage of Parylene is its ability to deposit using a chemical vapor deposition (CVD) process. Different types of Parylene, e.g., Parylene C, Parylene D, and Parylene N may be suitable for the polymer layer. Other suitable materials for the polymer layer 202 and other polymer layers in the check valve 100 may include, for example, Mylar®, polyurethane, fluorosilicone, and fluoropolymers such as polytetrafluoroethylene (PTFE). The polymer layers may be vapor deposited, spin-coated, laminated, or otherwise deposited.

A sacrificial photoresist layer 204 may be spin-coated and patterned on the front surface of the wafer form the geometry of the chamber 134 in an uncollapsed state. The photoresist layer may include a 4 $\mu$m layer of an AZ4400-type photoresist and a 1.5 $\mu$m layer of an AZ1518-type photoresist, both supplied by Hoechst Celanese Corporation of Somerville, N.J. The wafer may then be baked at about 120° C. followed by deposition of a 1 $\mu$m Parylene C layer 205.

Figure 2B:
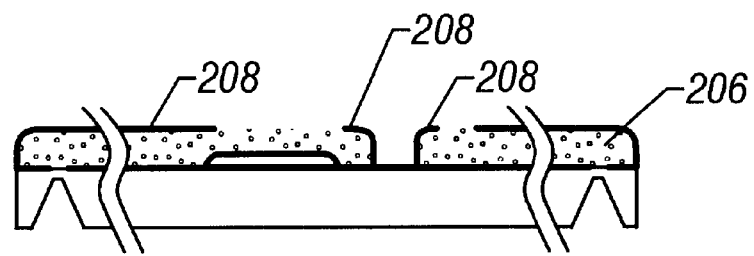

After patterning the Parylene C layer 205 with an oxygen plasma, a 5 $\mu$m thick (AZ4400) photoresist layer may be spin-coated and patterned to form a sacrificial photoresist layer 206 for the channel 102, as shown in FIG. 2B. Next, a 3 to 4 $\mu$m thick Parylene C layer 208 may be deposited. This Parylene C layer 208 corresponds to the channel 102 and the valve seat 120 in the check valve 100.

According to an embodiment, the calculated threshold pressure, that is, the forward pressure necessary to lift the sealing cap 122 off of the valve seat 120, is about 0.3 psi. However, it has been discovered that a strong stiction force may exist between the Parylene surfaces of the sealing cap 122 and the valve seat 120. For example, even with a contacting ring area less than 10 $\mu$m wide, a forward pressure of about 35 psi may be necessary to overcome the stiction force between the sealing cap 122 and the valve seat 120 and open the check valve 100. To reduce this stiction force, one or both of the Parylene C contacting surfaces may be modified chemically and physically.

The Parylene C surface of the valve seat 120 may be chemically modified by roughened the Parylene C layer 208 in oxygen plasma for a few minutes. The contacting surface may be physically modified by evaporating a few hundred angstroms of gold or a chrome/gold multi-layer to form the metal layer 130 on the valve seat 120, as shown in FIG. 2B. According to an embodiment, the metal layer 130 may be a 100 Å Cr/500 Å Au multi-layer film. A monolayer of an alkanethiol may also be deposited on a gold layer 130 to make the gold surface more hydrophobic.

Figure 2C:
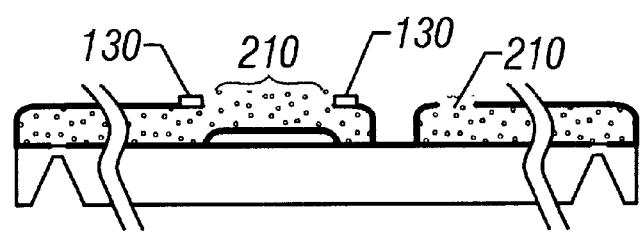
Figure 2D:
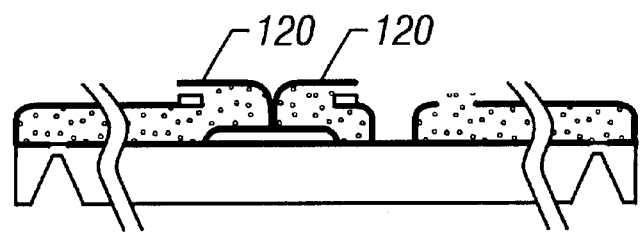
Figure 2E:
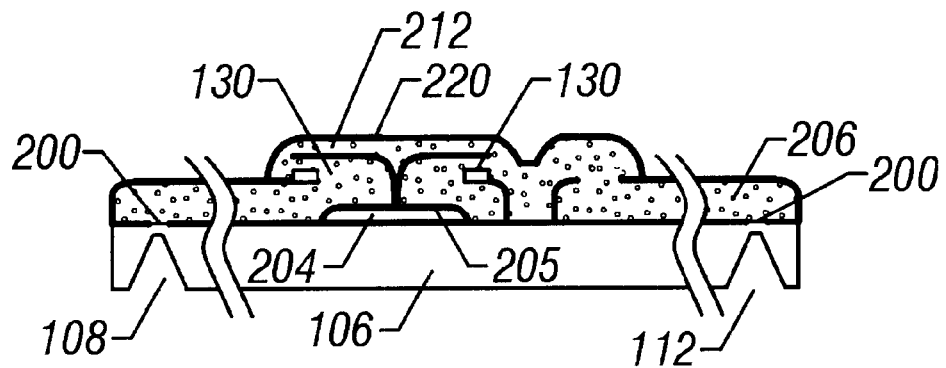

A 2 $\mu$m sacrificial (AZ4400) photoresist layer 210 for the sealing cap 122 may be spin-coated and patterned over the valve seat 120 and metal layer 130, as shown in FIG. 2C. After the photoresist layer 210 is baked, a 1 $\mu$m Parylene C layer may be deposited on the photoresist layer 210 and patterned in an oxygen plasma to form the sealing cap 120, as shown in FIG. 2D.

A 6 $\mu$m sacrificial (AZ4400) photoresist layer 212 may be spin-coated and patterned over the sealing cap 122 and baked. A 3 $\mu$m Parylene C layer may be deposited over the photoresist layer 212 to provide a top cover membrane 220 for the check valve 100 and the channel 102, as show in FIG. 2E.

Figure 2F:
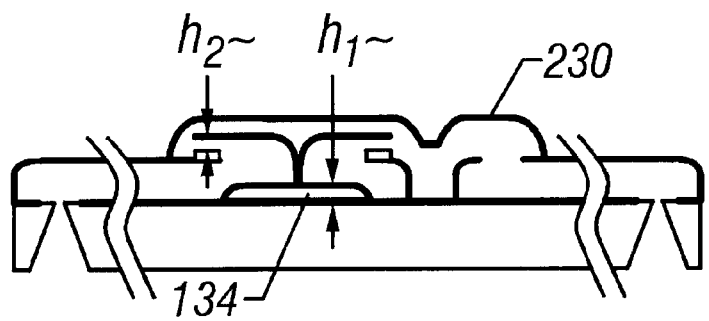

The thin silicon membrane 200 remaining in the inlet 108 and the outlet 112 may be etched away with BrF$_3$ from the backside of the wafer to expose the photoresist layers 204, 206, 210, and 212. After the wafer is diced, a chip containing the check valve assembly 116 may be submerged in acetone at room temperature for 10 hours or more to remove the photoresist layers, as shown in FIG. 2F.

A 3 $\mu$m thick Parylene C layer 230 may then be deposited over the check valve assembly 116. In this state, the height, $h_1$, of the chamber 134 may be about 5 $\mu$m and the gap, $h_2$, between the sealing cap 122 and the metal ring 130 about 3 $\mu$m. Due to the relatively small Young's Modulus of Parylene C, about 3 GPa, the chamber 134 may be relatively easy to collapse.

Figure 2G:
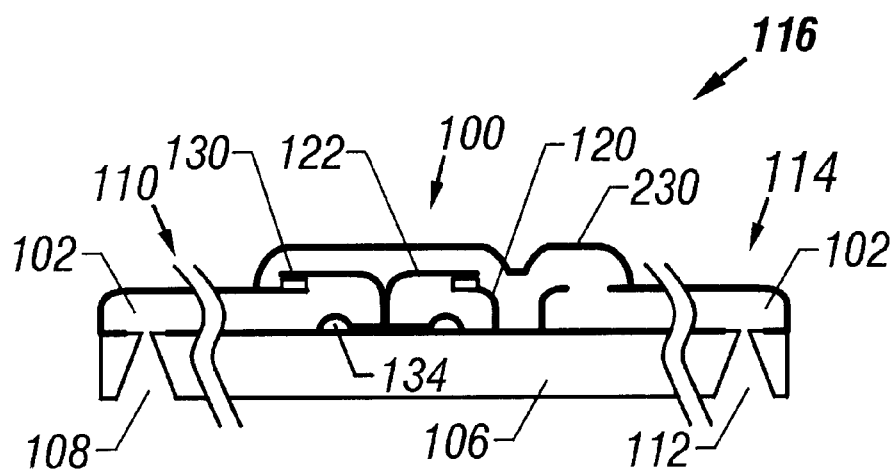

With the chamber 134 collapsed, as shown in FIG. 2G, the circumferential sealing area of the sealing cap 122 is pressed against the metal ring 130 on the valve seat 120. This seals the check valve 100, biasing the check valve 100 in the normally closed position. Sealing may be verified by the presence of Newton rings observed in the collapsed chamber 134.

Figure 3A:
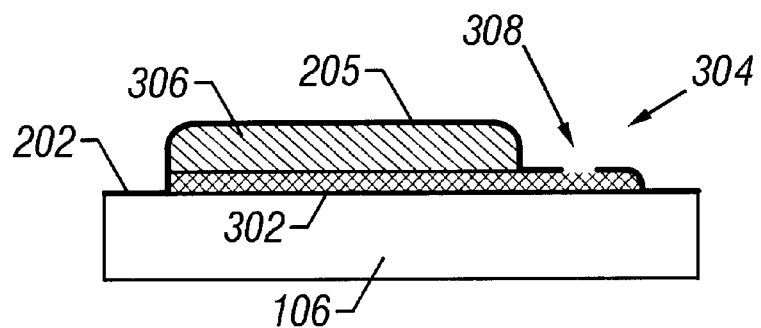
FIGS. 3A–3D illustrate a number of stages in process for forming a collapsed chamber according to alternate embodiments.
Figure 3B:
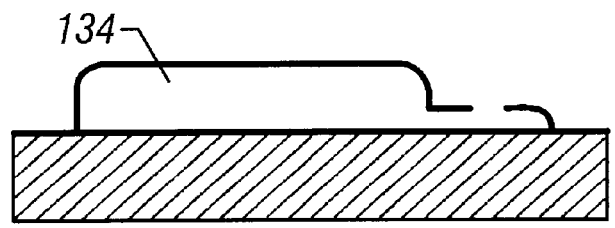
Figure 3C:
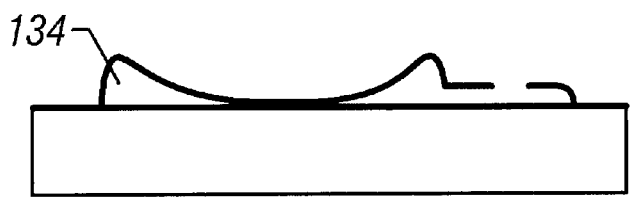
Figure 3D:
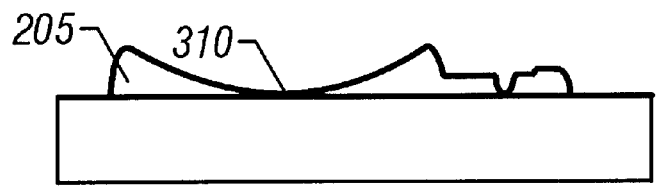

FIGS. 3A–3D illustrate stages in an exemplary process for fabricating and collapsing the chamber 134. The sacrificial layer 204 for the chamber 134 may include two sacrificial layers. A lower layer 302 may be a metal or photoresist layer that corresponds to the shape of an exhaust chamber 304 for the chamber 134 and an upper layer 306 that corresponds to the shape of the body of the chamber 134. The Parylene C layer 205 may be deposited and baked, and then patterned and etched to form an outlet 308 in the exhaust chamber 304, as shown in FIG. 3A. The sacrificial layers 302 and 304 may be removed using acetone, as shown in FIG. 3B. Depending upon the geometry of the chamber 134, the chamber may collapse automatically due to an inherent stiction force between the Parylene C layers 202 and 205, as shown in FIG. 3C. Such an automatic collapsing may occur for a chamber having a diameter greater than about 150 $\mu$m and a Parylene layers 205 thickness of about 1 $\mu$m. The chamber 134 may also be collapsed by pulling a vacuum in the chamber to create a pressure difference of about one atmosphere between the chamber 134 and the channel 102 at room temperature. According to an alternate embodiment, the chamber 134 may be collapsed by depositing another Parylene layer 310 on the Parylene layer 205.

According to an embodiment, the check valve 100 may be removed from the substrate 106 after the above-described fabrication steps have been performed.

Figure 4:
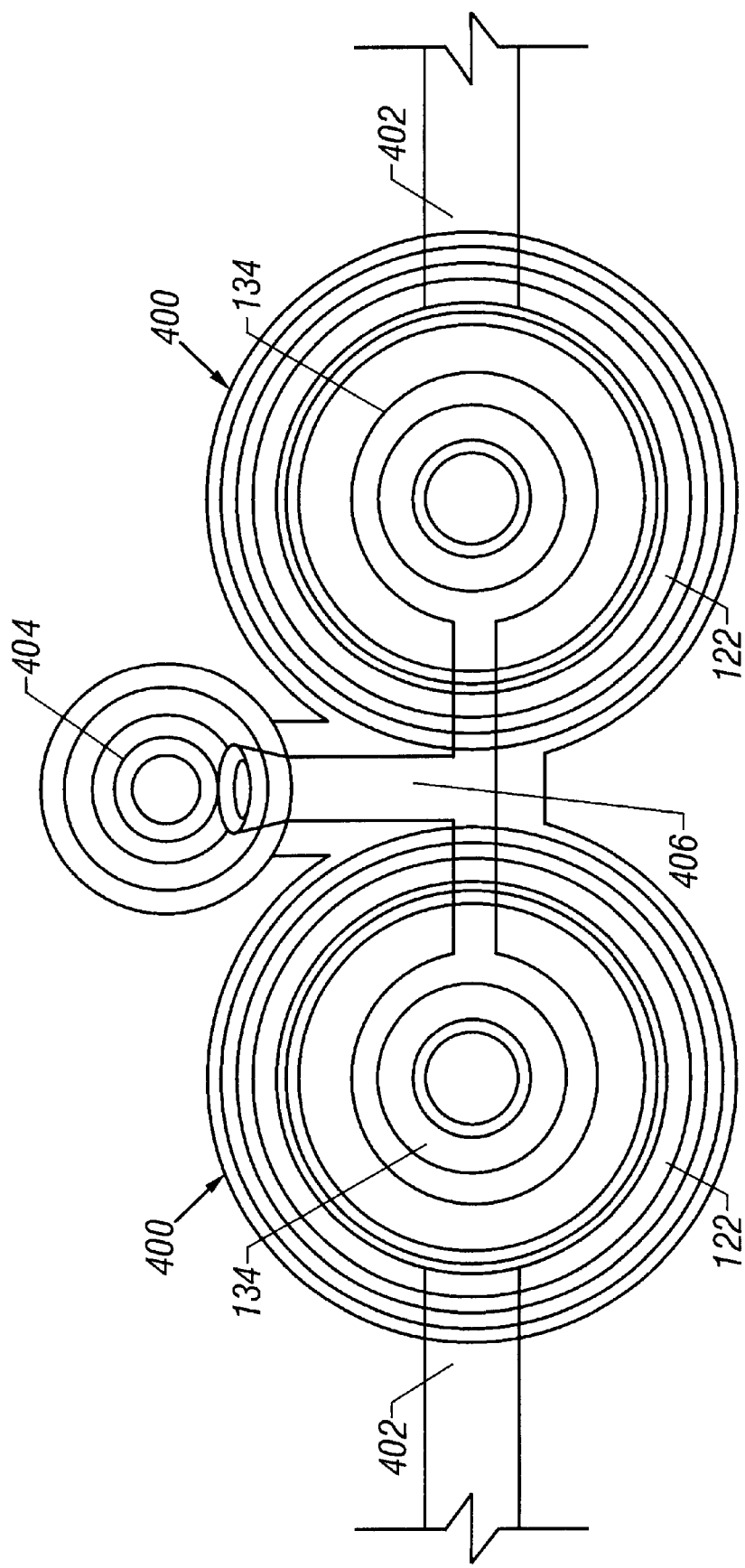
FIG. 4 illustrates a pair of check valves in a channel.

FIG. 4 illustrates a pair of check valves 400 in a channel 402 according to an embodiment. A vacuum port 404 may be provided between the two check valves 400. The vacuum port 404 may be connected to the chamber 134 of each check valve 400 by a T-shaped channel 406. The chambers 134 may be collapsed by drawing air in the chambers 134 out through the vacuum port and then sealing the port 404.

The check valve 100 according to various embodiments is contemplated for use in compact fluidic systems that may handle mixing and delivery of fluids in small volumes. For example, a number of micro-fluidic system components, including check valves, channels, and micropumps, may be combined to reproduce a fairly complex bench process on a card-type module. Such a card-type module may be used for processing biological samples and may be disposable.

A number of embodiments of the invention have been described. Nevertheless, it will be understood that various modifications may be made without departing from the spirit and scope of the invention. Accordingly, other embodiments are within the scope of the following claims.

What is claimed is:

1. A check valve comprising:
   a valve seat having a perimeter including a contacting edge;
   a sealing cap having a perimeter including a sealing edge positioned over and overlapping the contacting edge; and
   a collapsed chamber connected to the sealing cap, said collapsed chamber biasing the check valve in a normally closed position in which the sealing edge presses against the contacting edge.

2. The check valve of claim 1, wherein the sealing cap has a diameter between about 50 $\mu$m and about 500 $\mu$m.

3. The check valve of claim 1, wherein the sealing cap comprises a polymer membrane.

4. The check valve of claim 3, wherein the polymer membrane comprises Parylene.

5. The check valve of claim 3, wherein the polymer membrane comprises a material selected from Mylar®, polyurethane, flourosilicone, and polytetrafluoroethylene.

6. The check valve of claim 1, wherein the check valve further comprises a metal layer attached to the contacting edge of the valve seat.

7. The check valve of claim 1, further comprising an inlet adjacent the valve seat.

8. A check valve assembly comprising:
   a channel having a width in a range of from about 10 $\mu$m to about 400 $\mu$m connected to a substrate, said channel including a front portion and a rear portion; and
   a check valve connected to the substrate between the front portion of the channel and the rear portion of the channel, said check valve having a width in a range of from about 50 $\mu$m to about 500 $\mu$m, and comprising
   a valve seat connected to the front portion of the channel;
   a collapsed chamber positioned on the substrate and adjacent to the valve seat; and
   a sealing cap connected to the collapsed chamber, said sealing cap including an edge portion adapted to contact a sealing area of the valve seat in a closed position, thereby sealing the check valve.

9. The check valve assembly of claim 8, wherein each of the valve seat and the sealing cap comprise a polymer membrane.

10. The check valve assembly of claim 9, wherein the polymer membrane comprises Parylene.

11. The check valve assembly of claim 9, wherein the polymer membrane comprises a material selected from Mylar®, polyurethane, flourosilicone, and polytetrafluoroethylene.

12. The check valve assembly of claim 9, wherein said polymer membrane has a thickness in a range of from about 1 $\mu$m to about 5 $\mu$m.

13. The check valve assembly of claim 13, wherein the check valve further comprises a metal layer attached to the sealing area of the valve seat, wherein the metal layer separates the sealing cap and the valve seat in a closed position of the check valve.

14. The check valve of claim 13, wherein the metal layer comprises a gold layer.

15. The check valve assembly of claim 14, wherein the metal layer further comprises a chrome layer.

16. The check valve assembly of claim 15, wherein the gold layer is about 500 Å thick and the chrome layer is about 100 Å thick.

17. A method for fabricating a check valve, comprising:
    depositing a first polymer layer on a substrate;
    depositing a sacrificial layer having a shape corresponding to a chamber on the first polymer layer;
    depositing a second polymer layer on the sacrificial layer to form the chamber;
    forming a valve seat over the chamber, said valve seat having a perimeter including a contacting edge;
    forming a sealing cap on the chamber, said sealing cap having a perimeter including a sealing edge that overlaps the contacting edge of the valve seat;
    removing the sacrificial layer; and
    collapsing the chamber, thereby pulling the sealing edge into sealing contact with the contacting edge.

18. The method of claim 17, further comprising providing a port in the chamber.

19. The method of claim 18, wherein said collapsing the chamber comprises drawing a vacuum in the chamber through the port.

20. The method of claim 18, wherein the first and second polymer layers comprise Parylene, and wherein said collapsing the chamber occurs in response to a stiction force between said first and second polymer layers.

* * * * *